US007009523B2

(12) United States Patent
Blum et al.

(10) Patent No.: US 7,009,523 B2
(45) Date of Patent: Mar. 7, 2006

(54) MODULAR PROTECTIVE STRUCTURE FOR FLOOR DISPLAY

(75) Inventors: Ronald D. Blum, Roanoke, VA (US); Dwight P. Duston, Laguna Niguel, CA (US); William Kokonaski, Gig Harbor, WA (US)

(73) Assignee: Intellimats, LLC, Roanoke, VA (US)

( * ) Notice: Subject to any disclaimer, the term of this patent is extended or adjusted under 35 U.S.C. 154(b) by 179 days.

(21) Appl. No.: 10/454,631

(22) Filed: Jun. 5, 2003

(65) Prior Publication Data

US 2004/0021617 A1 Feb. 5, 2004

Related U.S. Application Data

(63) Continuation-in-part of application No. 10/438,923, filed on May 16, 2003, which is a continuation-in-part of application No. 10/285,639, filed on Nov. 1, 2002, which is a continuation of application No. 10/137, 357, filed on May 3, 2002, now Pat. No. 6,507,285, which is a continuation of application No. 09/767, 846, filed on Jan. 24, 2001, now Pat. No. 6,417,778, which is a continuation of application No. 09/418, 752, filed on Oct. 15, 1999, now abandoned, which is a continuation-in-part of application No. 09/304,051, filed on May 4, 1999, now Pat. No. 6,219,876.

(60) Provisional application No. 60/385,579, filed on Jun. 5, 2002.

(51) Int. Cl.
*G08B 5/00* (2006.01)

(52) U.S. Cl. ............................... 340/815.4; 340/691.6; 345/1.3

(58) Field of Classification Search ............. 340/815.4, 340/691.6; 345/1.3
See application file for complete search history.

(56) References Cited

U.S. PATENT DOCUMENTS

| | | | |
|---|---|---|---|
| 2,191,704 | A | 2/1940 | Bennett |
| 2,254,830 | A | 9/1941 | Schloss |
| 2,282,672 | A | 5/1942 | Nelson |
| 2,512,310 | A | 6/1950 | Corson |
| 2,800,215 | A | 7/1957 | Converse |
| 2,843,868 | A | 7/1958 | Borgstorm |
| 2,919,456 | A | 1/1960 | Spivey |
| 3,078,490 | A | 2/1963 | Etcher |
| 3,083,393 | A | 4/1963 | Nappi |
| 3,141,522 | A | 7/1964 | Fitzpatrick |
| 3,183,116 | A | 5/1965 | Schaar |
| 3,300,275 | A | 1/1967 | Lorman |
| 3,400,421 | A | 9/1968 | Nappi et al. |
| 3,435,481 | A | 4/1969 | Kessler |
| 3,501,797 | A | 3/1970 | Nappi |
| 3,517,407 | A | 6/1970 | Wyant |
| 3,578,738 | A | 5/1971 | Hughes |
| 3,663,980 | A | 5/1972 | Conklin |

(Continued)

FOREIGN PATENT DOCUMENTS

| | | |
|---|---|---|
| DE | 3 147 113 | 6/1983 |

(Continued)

OTHER PUBLICATIONS

Protective Products Advertisement.

(Continued)

*Primary Examiner*—Thomas Mullen
(74) *Attorney, Agent, or Firm*—Kenyon & Kenyon

(57) ABSTRACT

Embodiments of the present invention relate to a floor display system with a modular protective structure for preventing damage to the display system due to its use in a floor environment. The modular protective structure may be configured to provide a distributed system of vertical supports to absorb and diffuse pressures and impacts on the floor display system.

28 Claims, 6 Drawing Sheets

U.S. PATENT DOCUMENTS

| | | | | |
|---|---|---|---|---|
| 3,665,543 | A | 5/1972 | Nappi | |
| 3,696,459 | A | 10/1972 | Kucera et al. | |
| 3,699,926 | A | 10/1972 | Stockl | |
| 3,717,897 | A | 2/1973 | Amos et al. | |
| 3,785,102 | A | 1/1974 | Amos | |
| 3,886,620 | A | 6/1975 | Miller | |
| 3,906,578 | A | 9/1975 | Huber | |
| 3,909,996 | A | 10/1975 | Ettlinger, Jr. et al. | |
| 3,916,401 | A | 10/1975 | Freeman | |
| 3,930,084 | A | 12/1975 | Shields | 428/67 |
| 4,107,811 | A | 8/1978 | Imsande | |
| 4,126,854 | A | 11/1978 | Sheridon | |
| 4,143,103 | A | 3/1979 | Sheridon | |
| 4,143,194 | A | 3/1979 | Wihksne | |
| 4,328,275 | A | 5/1982 | Vargo | |
| 4,353,944 | A | 10/1982 | Tarui | |
| 4,421,809 | A | 12/1983 | Bish et al. | |
| 4,435,451 | A | 3/1984 | Neubert | |
| 4,439,474 | A | 3/1984 | Sagel | |
| 4,482,593 | A | 11/1984 | Sagel et al. | |
| 4,484,250 | A | 11/1984 | Rzepecki et al. | |
| 4,559,250 | A | 12/1985 | Paige | |
| 4,564,546 | A | 1/1986 | Jones | |
| 4,609,580 | A | 9/1986 | Rockett et al. | |
| 4,614,679 | A | 9/1986 | Farrington et al. | |
| 4,660,828 | A | 4/1987 | Weiss | 482/123 |
| 4,665,342 | A | 5/1987 | Topp et al. | 313/505 |
| 4,707,895 | A | 11/1987 | Lang | |
| 4,720,789 | A | 1/1988 | Hector et al. | |
| 4,752,114 | A | 6/1988 | French | 350/96.24 |
| 4,798,754 | A | 1/1989 | Tomek | |
| 4,822,669 | A | 4/1989 | Roga | |
| 4,853,678 | A | 8/1989 | Bishop, Jr. et al. | 340/573 |
| 4,917,975 | A | 4/1990 | DeGuzman | |
| 4,959,265 | A | 9/1990 | Wood | |
| 4,974,857 | A | 12/1990 | Beall et al. | 273/371 |
| 5,018,235 | A | 5/1991 | Stamatiou | |
| 5,071,628 | A | 12/1991 | Alazet | |
| 5,142,733 | A | 9/1992 | Mogel et al. | |
| 5,161,041 | A | 11/1992 | Abileah et al. | 359/40 |
| 5,204,159 | A | 4/1993 | Tan | |
| 5,293,660 | A | 3/1994 | Park | |
| 5,335,788 | A | 8/1994 | Beasley et al. | |
| 5,344,693 | A | 9/1994 | Sanders | |
| 5,460,381 | A | 10/1995 | Smith et al. | 273/238 |
| 5,461,748 | A | 10/1995 | Koiduka et al. | |
| 5,500,267 | A | 3/1996 | Canning | |
| 5,556,685 | A | 9/1996 | Swicegood, Jr. | |
| 5,561,446 | A | 10/1996 | Montlick | 345/173 |
| 5,562,580 | A | 10/1996 | Beasley et al. | |
| 5,571,626 | A | 11/1996 | Cumming et al. | |
| 5,589,246 | A | 12/1996 | Calhoun | |
| 5,604,027 | A | 2/1997 | Sheridon | |
| 5,613,313 | A | 3/1997 | Homan et al. | |
| 5,646,818 | A | 7/1997 | Hahn | 361/681 |
| 5,658,637 | A | 8/1997 | Volz | |
| 5,703,564 | A | 12/1997 | Begum et al. | 340/539 |
| 5,723,204 | A | 3/1998 | Stefik | |
| 5,747,133 | A | 5/1998 | Vinod et al. | 428/46 |
| 5,805,117 | A | 9/1998 | Mazurek et al. | 345/1 |
| 5,815,995 | A | 10/1998 | Adam | |
| 5,816,550 | A | 10/1998 | Watanabe et al. | 248/222.11 |
| 5,826,874 | A | 10/1998 | Teitell et al. | |
| 5,839,976 | A | 11/1998 | Darr | |
| 5,848,830 | A | 12/1998 | Castle et al. | 362/84 |
| 5,869,350 | A | 2/1999 | Heeger et al. | |
| 5,885,684 | A | 3/1999 | Hefner et al. | 428/89 |
| 5,886,474 | A | 3/1999 | Asai et al. | 315/169.1 |
| 5,913,727 | A | 6/1999 | Ahdoot | 463/39 |
| 5,945,502 | A | 8/1999 | Hsieh et al. | |
| 5,971,761 | A | 10/1999 | Tillman, Sr. | 434/81 |
| 6,010,429 | A | 1/2000 | Prueitt | |
| 6,084,526 | A | 7/2000 | Blotky et al. | |
| 6,219,876 | B1 | 4/2001 | Blum | |
| 6,233,776 | B1 | 5/2001 | Blum et al. | |
| 6,247,650 | B1 | 6/2001 | Vachette et al. | 235/487 |
| 6,378,925 | B1 | 4/2002 | Greenlee | 294/171 |
| 6,417,778 | B1 | 7/2002 | Blum et al. | |
| 2001/0011399 | A1 | 8/2001 | Blum et al. | |

FOREIGN PATENT DOCUMENTS

| | | |
|---|---|---|
| DE | 87 01 817 | 4/1987 |
| DE | 3 923 959 | 10/1990 |
| DE | 3923959 | 10/1990 |
| DE | 3 915 254 | 11/1990 |
| DE | 40 06 781 | 9/1991 |
| DE | 4135877 | 5/1993 |
| DE | 298 11 821 | 10/1998 |
| EP | 0 009 891 | 4/1980 |
| EP | 0 188 005 | 7/1986 |
| EP | 0 199 537 | 10/1986 |
| EP | 0 202 846 | 11/1986 |
| EP | 0 353 139 | 1/1990 |
| EP | 0 354 281 | 2/1990 |
| EP | 0 359 478 | 3/1990 |
| EP | 0 365 869 | 5/1990 |
| EP | 0 374 860 | 6/1990 |
| EP | 0 421 258 | 4/1991 |
| EP | 0 448 768 | 10/1991 |
| EP | 0 512 904 | 11/1992 |
| EP | 0 514 191 | 11/1992 |
| EP | 0 554 641 | 8/1993 |
| EP | 0 573 277 | 12/1993 |
| EP | 0 624 125 | 11/1994 |
| EP | 0 624 681 | 11/1994 |
| EP | 0 648 834 | 4/1995 |
| EP | 0 721 176 | 7/1996 |
| EP | 0 751 213 | 1/1997 |
| EP | 0 794 244 | 9/1997 |
| EP | 0 839 900 | 5/1998 |
| EP | 0 895 745 | 2/1999 |
| EP | 0 971 064 | 1/2000 |
| FR | 2 532 095 | 2/1984 |
| GB | 319 416 | 9/1929 |
| GB | 433 133 | 8/1935 |
| GB | 2 182 242 | 5/1987 |
| GB | 2 263 003 | 7/1993 |
| JP | 4 144 532 | 5/1992 |
| JP | 06-090891 | 4/1994 |
| JP | 6 189 890 | 7/1994 |
| JP | 8056810 | 3/1996 |
| JP | 08-239988 | 9/1996 |
| JP | 10057728 | 3/1998 |
| JP | 11-109901 | 4/1999 |
| JP | 2000-105558 | 4/2000 |
| JP | 2002-00059 | 7/2000 |
| WO | 91/08701 | 6/1991 |
| WO | 93/20536 | 10/1993 |
| WO | 00/07811 | 2/2000 |
| WO | 00/16682 | 3/2000 |
| WO | 00/79871 | 4/2000 |
| WO | 00/29209 | 5/2000 |
| WO | 01/27909 | 4/2001 |
| WO | 02/11110 | 2/2002 |
| WO | 02/22972 | 3/2002 |
| WO | 02/065451 | 8/2002 |

OTHER PUBLICATIONS

Sole-Parmer Advertisement.

3m Clean-Welk Mat, 5800 Series, Technical Data, Jul. 1995.

Advertising Materials for Alma (Advanced Laminated Material Applications, Inc.) ClenStep Contamination Control Mat, 12 pages, 1999.
*Displaying a Winning Glow*, Michael Kenward, Technology Review, Jan./Feb. 1999, vol. 102, No. 1, 7 pages.
*Screen Saviors*, Michael Mattis, Business 2.0, Jul. 1999, 1 page.
*What's New, Intelligent Ink*, Advertising Material, Popular, 1 page, no date.
*Electronic Ink*, Glen Sanders, ebooknet.com, 2 pages, Sep. 20, 1999.
MMR Journal, *Floor Decals New Wrinkle in P-O-P Ads*, vol. 16, No. 10, p. 13, Apr. 5, 1999, USA.
Philadelphia Enquirer, *Cherry Hill, N.J., Firm Wants You To Look Down On Its Ads*, Regional Newspaper, Aug. 27, 1998, USA.
*Floor Graphics*, advertisements, copyright 2002.
U.K. Patent Office Search Report dated May 28, 2003.
Patent Abstracts of Japan, vol. 1995, No. 05, Jun. 30, 1995 & JP 07 036395 A (Toray Ind Inc), Feb. 7, 1995.
Patent Abstracts of Japan, vol. 1997, No. 01, Jan. 31, 1997 & JP 08 239988 (Meitaku Syst:KK), Sep. 17, 1996.
Patent Abstracts of Japan, vol. 2002 & JP 2002 062832 A (Nippon Signal Co Ltd:The), Feb. 28, 2002.
Patent Abstracts of Japan, vol. 1995, No. 01, Feb. 28 1995 & JP 06 299682 A (Jiyonsuton:KK), Oct. 25 1994.
U.S. co-pending Appl. No. 10/373,191, filed Feb. 26, 2003.
U.S. co-pending Appl. No. 10/438,923, filed May 16, 2003.
U.S. co-pending Appl. No. 10/454,631, filed Jun. 5, 2003.
U.S. co-pending Appl. No. 10/682,435, filed Oct. 10, 2003.
U.S. co-pending Appl. No. 10/759,167, filed Jan. 20, 2004.

MODULAR PROTECTIVE STRUCTURE FOR FLOOR DISPLAY

CROSS-REFERENCE TO RELATED APPLICATIONS

This application claims the benefit under 35 U.S.C. §119 (e) of U.S. provisional application 60/385,579 filed Jun. 5, 2002. Further, this application is a continuation-in-part of co-pending application Ser. No. 10/438,923 , filed May 16, 2003. Application Ser. No. 10/438,923 is a continuation-in-part of co-pending application Ser. No. 10/285,639, filed Nov. 1, 2002, which is a continuation of application Ser. No. 10/137,357, filed May 3, 2002, and issued as U.S. Pat. No. 6,507,285 on Jan. 14, 2003. Application Ser. No. 10/137,357 is a continuation of application Ser. No. 09/767,846, filed Jan. 24, 2001, and issued as U.S. Pat. No. 6,417,778 on Jul. 9, 2002. Application Ser. No. 09/767,846 is a continuation of application Ser. No. 09/418,752, filed Oct. 15, 1999, and now abandoned. Application Ser. No. 09/418,752 is a continuation-in-part of application Ser. No. 09/304,051, filed May 4, 1999, and issued as U.S. Pat. No. 6,219,876 on Apr. 24, 2001. All of the above-identified applications are incorporated herein in their entirety by reference.

FIELD OF THE INVENTION

The present invention relates to a floor display system, and more specifically to a modular protective structure for the floor display system.

BACKGROUND

A number of media are known for publicly conveying information, such as advertising information. Most commonly, such media utilize "vertical space." That is, the media are typically such things as billboard displays, displays mounted on walls or ceilings, and displays on electronic devices such as television screens and computer monitor screens that are substantially vertical.

However, there is a vast amount of "horizontal space" that is largely unused for publicly conveying information. This horizontal space includes floor space in areas of public traffic, such as commercial establishments or other public buildings.

U.S. Pat. No. 6,417,778, which is fully incorporated herein by reference, discloses a system for electronically conveying information via a floor display. The present disclosure relates to a modular structure for such a floor display. Among other advantages disclosed for such a structure are its effectiveness in protecting the display from damage associated with a floor environment, and its convenience in sizing the display (expanding or shrinking the area of the display). A very thin form factor may be maintained for the modular structure.

DETAILED DESCRIPTION

Figure 1:
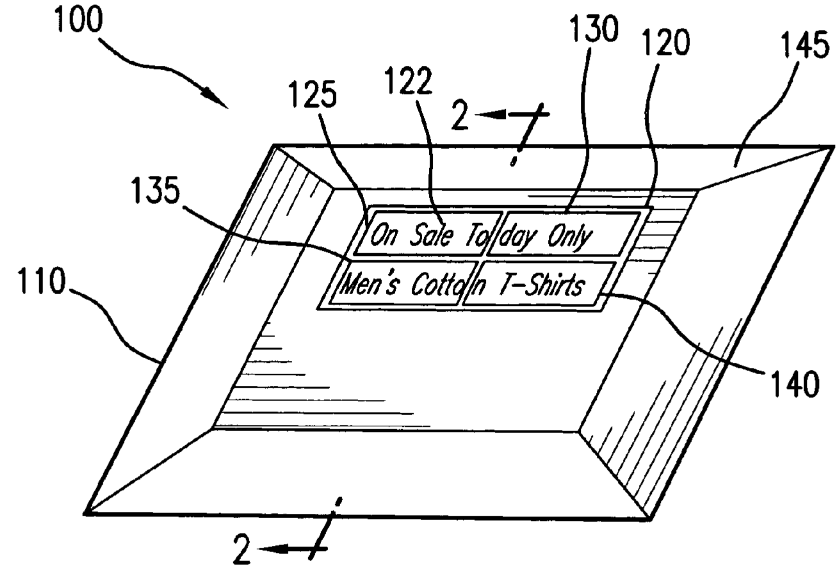
FIG. 1 shows a floor display system comprising an electronic display assembly including a modular protective structure according to embodiments of the present invention.

Embodiments of the present invention relate to a floor display system. The floor display system may be arranged in a public place, such as a commercial establishment or other public building, and be configured to display electronically modifiable arbitrary content, such as advertising or other informational content. Because of its environment when it is in use, the floor display system may be exposed to possible damage from the impacts of foot traffic, wheeled objects and the like. Accordingly, embodiments of the present invention relate to a modular protective structure for the display that effectively distributes forces applied to the display among a system of vertical supports, to prevent forces from being focused in one place and thus possibly damaging the display. The modular structure may further provide for a very thin form factor for the floor display system.

As noted above, U.S. Pat. No. 6,417,778 discloses a system for electronically conveying information via a floor display. More specifically, the floor display may incorporate a modifiable electronic display surface presenting for example, a liquid crystal display. The display could be connected to a computer and a computer generated image could be displayed on the display. Thus, the image displayed on the display could be modified by generating a different computer image and displaying that computer image on the display. The display could be associated with a base portion of a floor covering, such as included within a recess thereof, or could be included on a bottom surface, facing upward, of an insert portion of the floor covering. Alternatively, the display could be integrally formed with either of the base portion or the insert portion. The modifiable display could utilize a plurality of different graphics that can be displayed in any of a variety of manners on the display. For example, the graphics could be displayed in a generally fixed position on the display or could scroll across the display, with both exemplary methodologies displaying multiple graphics either individually or incombination.

Other alternatives for modifying graphics displayed on the floor covering include using light emitting polymers to create, and thus change, the graphics. The light emitting polymers can be either applied to, attached to, or woven into the floor covering. The light emitting polymers may be utilized on any portion of floor covering, for example, on either the base portion or the insert portion, or on any other portion of the different embodiments for the floor covering. Light emitting polymers are known and described in U.S. Pat. Nos. 5,945,502, 5,869,350, and 5,571,626, which are incorporated herein by reference in their entirety.

Other options for a display are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image.

Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer and thus, the World Wide Web by utilizing, for example, a Motorola paging system. Text on all displays, if multiple displays are used, can be changed at once by a single editor, through a Web page.

According to embodiments of the present invention, additional or alternative technologies to those described above may be used to implement a floor display system. A floor display system 100 according to embodiments of the present invention is shown in FIG. 1. The floor display system 100 includes an integrated electronic display assembly 120 associated with a floor covering 110. More specifically, the display assembly 120 may be at least partly connected to, supported by, received within or otherwise associated with the floor covering 110. The floor covering 110 and associated electronic display assembly 120 may take many structural forms and be constructed from various types of materials, and are not limited to the specific forms illustrated herein. The floor covering could include, for example, shoe-cleaning materials such as carpet, rubber, plastic and the like. The floor covering 110 may be affixed to a floor or may be portable so that it can be easily moved to different places. In embodiments, the floor covering 110 and electronic display assembly 120 are designed to be used in places where there is foot traffic or other (for example, wheeled shopping cart) traffic, such as entry ways to stores, public buildings or homes. In such environments, strong forces may be imparted to the floor covering and electronic display assembly. Accordingly, the floor covering and electronic display assembly may be sturdy and durable enough that they may be repeatedly stepped on, walked over, or have a wheeled shopping cart or other rolling or sliding object traverse them, with negligible adverse effect on the floor covering and display assembly.

To this end, the electronic display assembly 120 may comprise a plurality of display modules. In the embodiment shown in FIG. 1, there are four display modules 125, 130, 135 and 140, each associated with a modular protective enclosure as described in more detail further on. The invention is not limited to four display modules; there may be more or fewer. A coherent display may be presented on the plurality of display modules. That is, while individual display modules may present only fragments of a display, in the aggregate the plurality of display modules may present a complete or unified display. For example, in FIG. 1 a coherent text message, "On Sale Today Only Men's Cotton T-Shirts", is displayed across the four modules, though each module individually only presents a portion of the complete message. On the other hand, each of the modules could be configured to display unrelated images and/or text.

More specifically, a display module may be an electronic display device incorporating any display technology, including those disclosed herein, and others not specifically disclosed. A display module may be configured to electronically display graphical images and alphanumeric data in either a static (not moving or changing) or dynamic (e.g., scrolling or otherwise moving or changing) format. More specifically, a display module may be coupled by wired or wireless means to a controller (not shown) and modifiable via the controller to display any content chosen by a user. For example, a display module may be coupled to the controller via a display driver circuit such as a video graphics adapter card. The controller may include any kind of electronic logic circuit, for example, a general microprocessor configurable with software, or an ASIC (application specific integrated circuit). A driver of a display module may be integrated with the controller or built into an ASIC. The controller may also be in the form of a single board computer with a processor and memory and with one or more display driving circuits built onto the board, as well as wireless components for communicating with the outside world or for loading data into memory. The controller may be coupled to a storage medium, which could be any form of medium suitable for storing digital data, including RAM (random access memory), ROM (read-only memory), flash or other non-volatile solid-state electronic storage, EEPROM (electronically erasable and programmable read only memory), or magnetic and/or optical disk storage. The storage medium may store, for example, control software for execution by the controller and video content of choice for display, under the control of the control software, by a display module.

According to embodiments of the present invention, display modules of an assembly 120 may be arranged within separate protective enclosures comprising a bottom member, a top member, and vertical supports or sidewalls. In embodiments, elements of the protective enclosures may be common to the display modules; for example, the protective enclosures may have a common top member, bottom member, and one or more common sidewalls. In other embodiments, each display module may have a separate protective enclosure with a distinct bottom member, top member and sidewalls.

Figure 2:
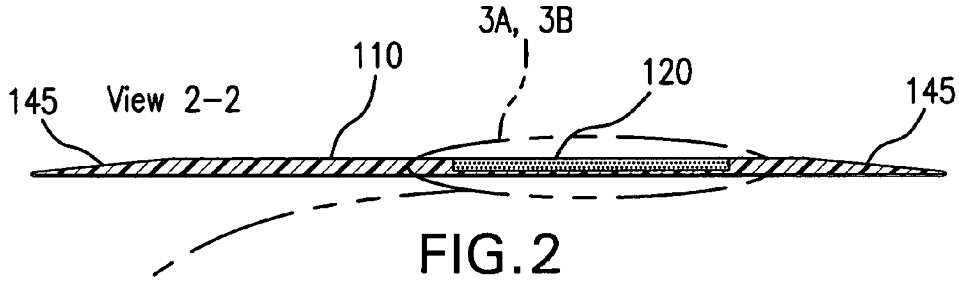
FIG. 2 shows a cross-section of the floor display system of FIG. 1.

FIG. 2 shows a cross-section of the floor display system 100 along line 2—2. In this view it can be seen that the floor covering 110 may comprise tapered sections or inclined surfaces 145 to create a smooth transition from a central portion of the floor covering, which may be configured to receive the display assembly 120, to the floor. Such inclined surfaces may make the floor covering easier to cross over, either by a person walking over the floor covering, or by a wheeled shopping cart, for example, if the floor covering is placed in the aisles of a commercial establishment.

Figure 3A:
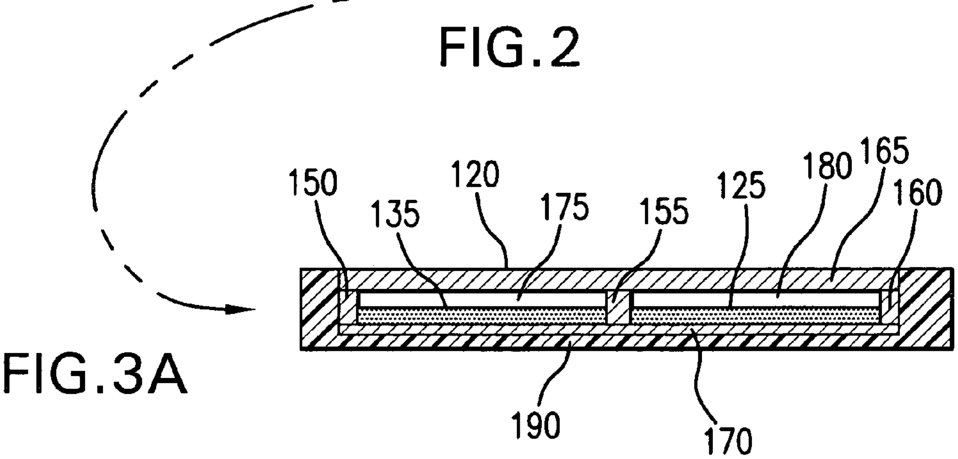
FIGS. 3A and 3B show an enlarged view of a portion of the cross-section of FIG. 2.

FIG. 3A shows an enlargement of an area from FIG. 2. In particular, FIG. 3A shows more details of a cross-sectional view that includes display modules 125 and 135, and illustrating protective enclosures according to embodiments of the invention. As shown in FIG. 3A, the display modules 135, 125 may be arranged within separate protective enclosures comprising a common bottom member 170, a common top member 165, and vertical support members or sidewalls 150, 155 and 160, with 155 being a common sidewall. The protective enclosures, in addition to being configured to receive the display modules, may provide volumes 175 and

180 between the top layer 165 and display modules 135, 125, respectively. The volumes may, for example, be empty space to avoid transferring shocks from the top member to the display modules. The top layer 165 could be formed from a clear material, for example, Plexiglass™, plastic or glass, to allow viewing of the display modules. The bottom layer 170 may rest on a backing layer 190 of the floor covering. The backing layer may be integrally formed with the floor covering. In alternative embodiments, there may be no backing layer; instead, there may be an opening passing all the way through the floor covering material and configured to receive a display assembly 120. In such a configuration, the bottom layer 170 of the protective modular enclosures could be in direct contact with the floor.

Figure 3B:
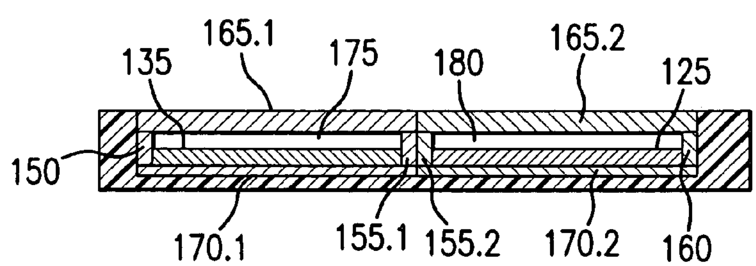

According to alternative embodiments, separate protective enclosures with distinct top and bottom members and vertical supports could be provided for each display module. Such an embodiment is illustrated in FIG. 3B. In FIG. 3B, display module 135 has a separate protective enclosure formed by bottom member 170.1, vertical supports 150 and 155.1, and top member 165.1. A volume 175 between the top member 165.1 and display module 135 may be provided. Similarly, display module 125 has a separate protective enclosure formed by bottom member 170.2, vertical supports 155.2 and 160, and top member 165.2. A volume 180 between the top member 165.2 and display module 125 may be provided. The vertical supports and bottom members of the protective enclosures could be made from materials including, for example, plastic, metal, glass or wood.

Advantages of the modular structures as shown in FIGS. 3A and 3B include that the structures provide excellent protection for the display modules from pressures and impacts applied to the assembly 120, at least in part because the pressures and impacts are shared by a system of vertical supports distributed across the assembly: i.e., vertical supports, for example, 150, 155 and 160 and vertical supports arranged transversely to these, as can be seen in FIG. 1 and subsequent figures. Thus, the pressures and impacts are not concentrated in any particular spot, but are instead distributed and diffused among the various members forming the protective enclosures.

Another advantage is that the modular structure enables the area of the display to be easily enlarged or reduced. An area of the floor covering 110 could be configured to receive a display assembly 120 within, for example, a recess or opening of some predetermined size. Display modules could removed from or added to the assembly to increase or decrease the display area within the bounds of the recess or opening. Alternatively, display modules of a given size could be replaced with a greater number of smaller modules and associated protective enclosures, to increase the number of vertical supports within the same area, as described in greater detail further on. On the other hand, display modules of a given size could be replaced with a smaller number of larger modules. Display modules removed from the assembly could be replaced with other materials of like dimensions in order to maintain an aesthetically pleasing appearance of the floor display system.

For example, the top member of the protective enclosures could be removable, to give access to the display modules, which could also be removable. To reduce the display area, selected display modules could be removed from their respective protective enclosures and replaced with, for example, "blanks" made of the same material as the floor covering and sized to fill the space within the protective enclosure, to prevent an unsightly gap. Such an arrangement would also allow for easy repair or replacement of a faulty display module without necessitating the removal of the entire assembly. In embodiments as in FIG. 3B, wherein each display module is provided with separate protective enclosure with distinct top and bottom members and vertical supports, a protective enclosure as a unit could be removable and replaced with a section of some other material.

Figure 4:
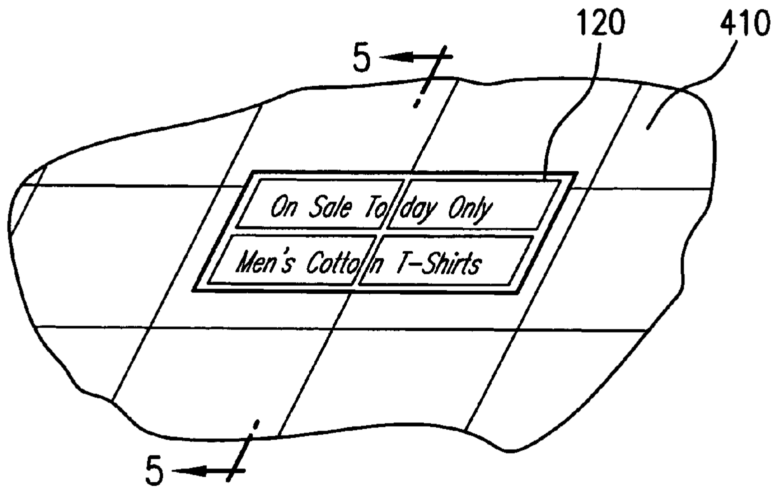
FIGS. 4–6 show three different views of an electronic display assembly according to embodiments of the invention received within a floor.
Figure 5:
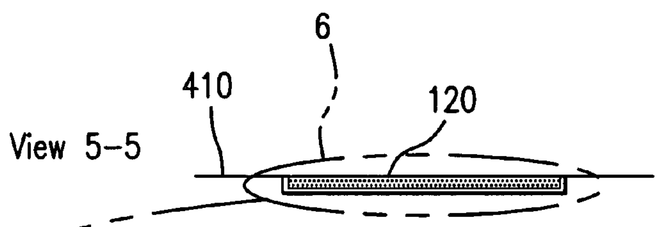
Figure 6:
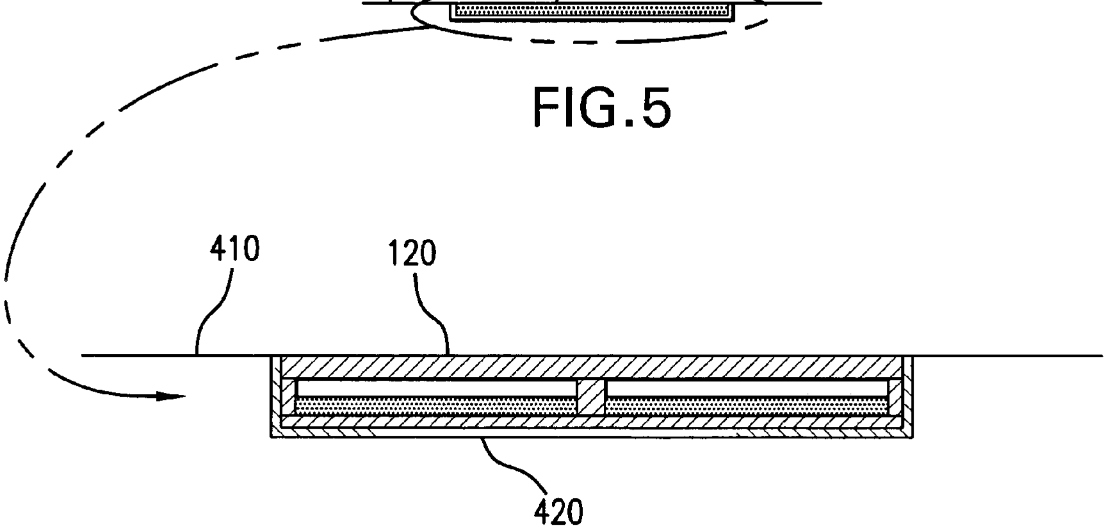

According to embodiments, a display assembly 120 need not be associated with a floor covering 110. Instead, as shown in FIGS. 4–6, the display assembly 120 could be received within a recess 420 in a floor 410.

Figure 7:
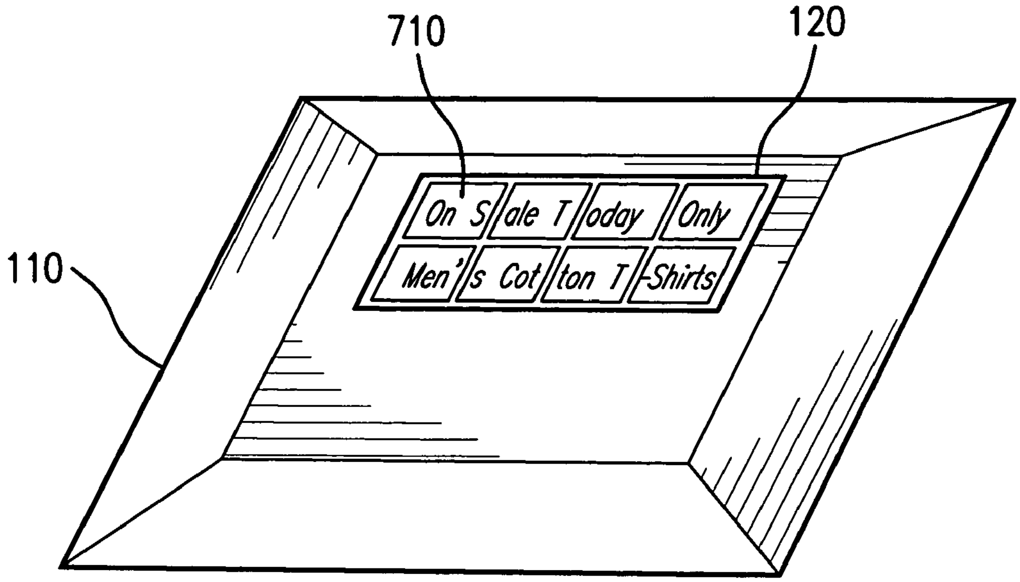
FIGS. 7 and 8 illustrate increased segmentation of an electronic display assembly as compared to that illustrated in FIGS. 1–6.

As discussed above, by providing a distributed system of vertical supports via the protective enclosures of the display modules of the assembly 120, forces applied to the top member or members of the assembly are shared among the vertical supports, and thus the structural integrity, and corresponding resistance of the assembly to impact damage is increased. This effect may be further enhanced by increasing the number of display modules and associated protective enclosures within the same overall area. This is illustrated in FIG. 7, where the display assembly 120, while having the same overall upper surface area as the assembly in FIG. 1, has twice as many display modules 710 and associated protective enclosures. Increasing the degree of segmentation of the display assembly in this way could enable the display assembly to be constructed to be more thin. Generally, a thinner display assembly is desirable since this creates less obstruction to traffic and may be more lightweight. Increasing segmentation could allow vertical supports of the protective enclosures to be made shorter, and the top member or members to be made thinner. Embodiments of the present invention may, in particular, provide for a display assembly thickness of less than 1 inch, with a preferred thickness of less than 0.5 inch.

Figure 8:
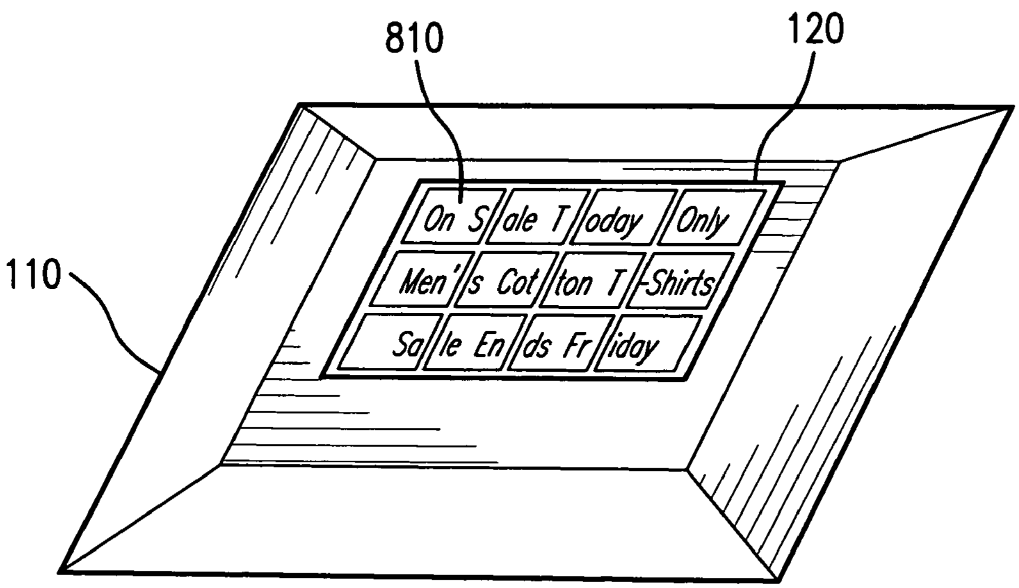

FIG. 8 illustrates increasing an overall display area while preserving structural integrity by increasing segmentation. More specifically, in FIG. 8, an overall area of the display assembly 120 is approximately twice that shown in FIGS. 1 and 7, enabling more information to be displayed, while structural integrity is preserved by increasing the number of display modules 810 and associated protective enclosures.

Figure 9:
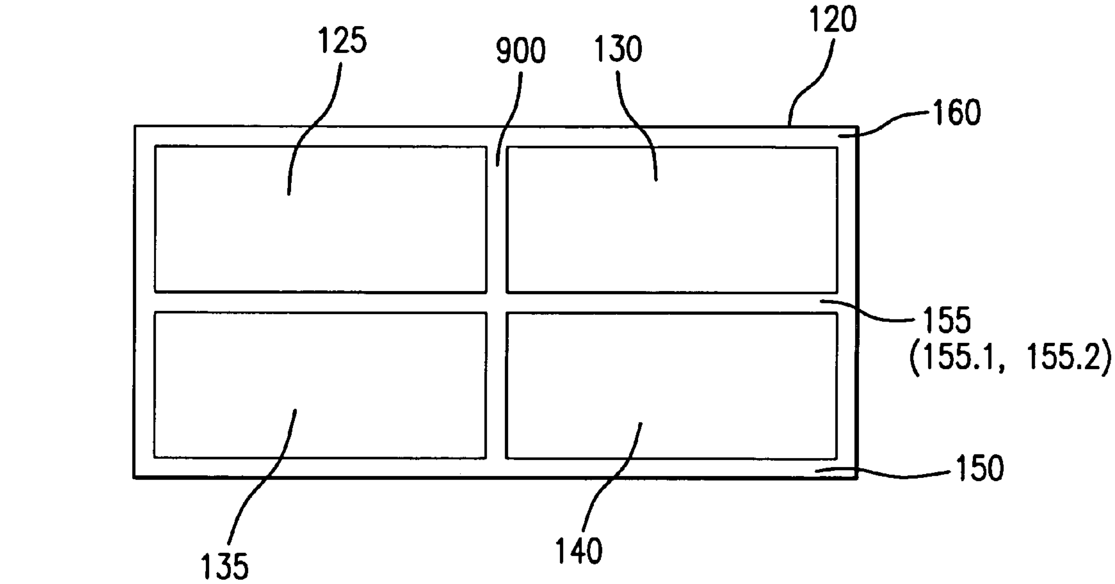
FIGS. 9, 10, 11A, 11B and 12 are plan views illustrating alternative embodiments for vertical supports of an electronic display system according to the invention.

FIG. 9 shows a top or plan view of the display assembly 120 discussed in connection with FIGS. 1–3B. In FIG. 9 it can be seen that the vertical supports 150, 155 (or 155.1, 155.2) and 160 may form, either as a unitary structure or a composite structure (e.g. if the modular protective enclosures are separate and distinct), a "beam" vertical support: i.e., a continuous member that extends across substantially the entirety of the display area. Member 900 is a transverse beam vertical support.

Figure 10:
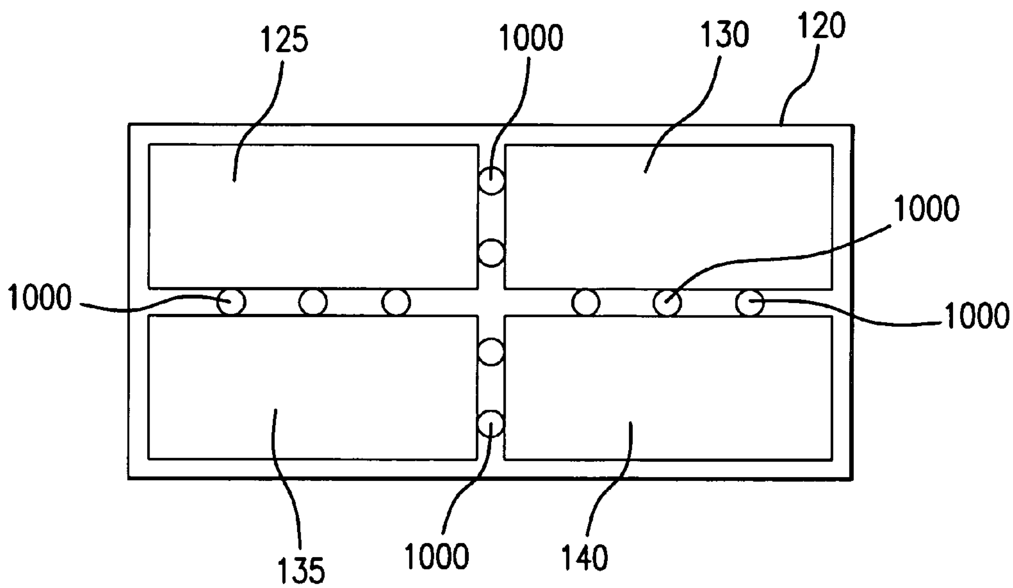

By contrast, FIG. 10 illustrates an alternative embodiment utilizing vertical supports that do not extend continuously across the display area as beams. Instead, columns 1000 are used as vertical supports, as opposed to continuous beams. This kind of construction could be more economical with materials. The columns 1000 are shown as small circles in the view of FIG. 10, corresponding to cylindrical support columns, but the support columns could be any shape.

Figure 11A:
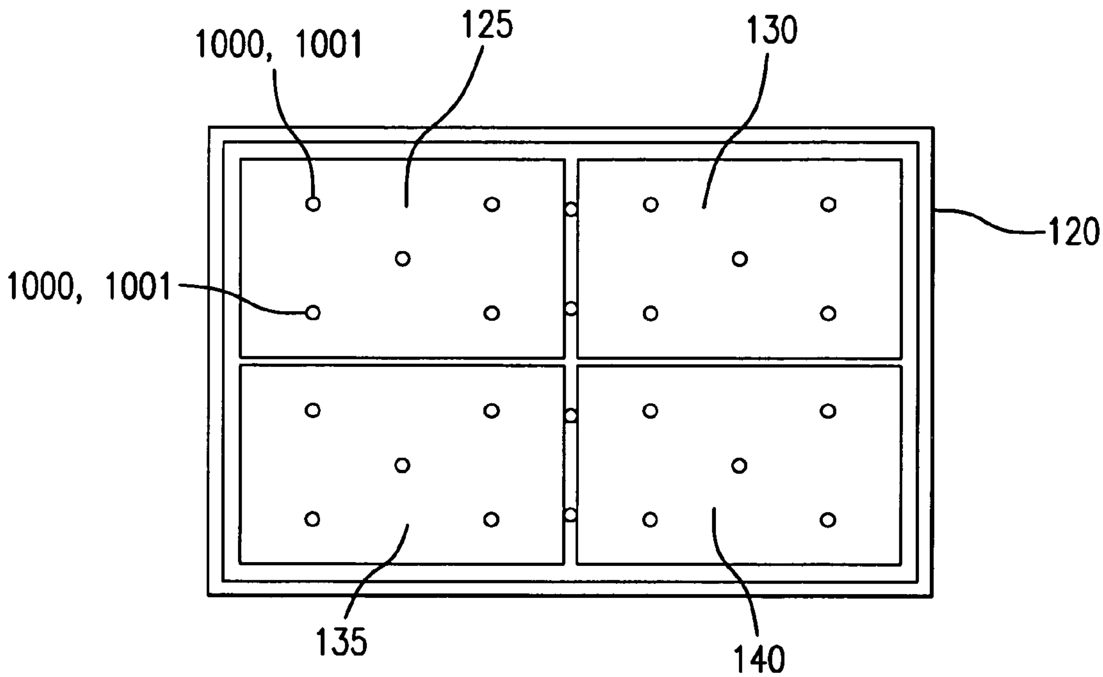
Figure 11B:
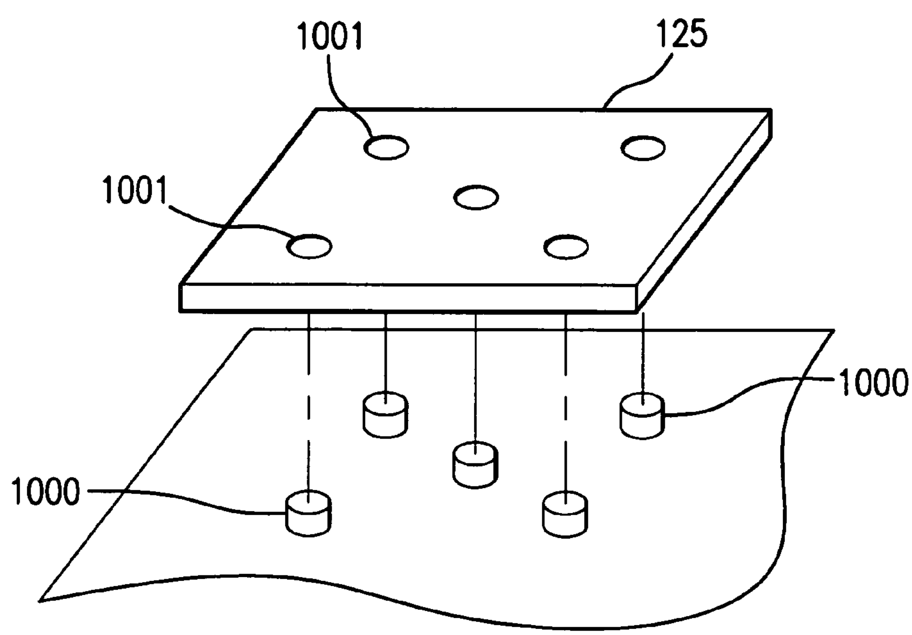

In still further embodiments, the display modules may have apertures formed therein configured to receive vertical supports. For example, as shown in FIGS. 11A and 11B, display modules 125, 130, 135 and 140 could have apertures 1001 formed therein configured to receive vertical supports 1000. Again, the vertical supports 1000 are shown as round columns by way of example, but could take other shapes: for example, columns or blocks of material that are square or rectangular in cross-section, or any other kind of discontinuous projection configured to be received within a corresponding aperture in a display module. When received within apertures of a display module, the vertical supports 1000 may project beyond an upper surface of the display module to support a top protective member of a protective enclosure and provide a volume of space between the top member and the module, as described above.

Figure 12:
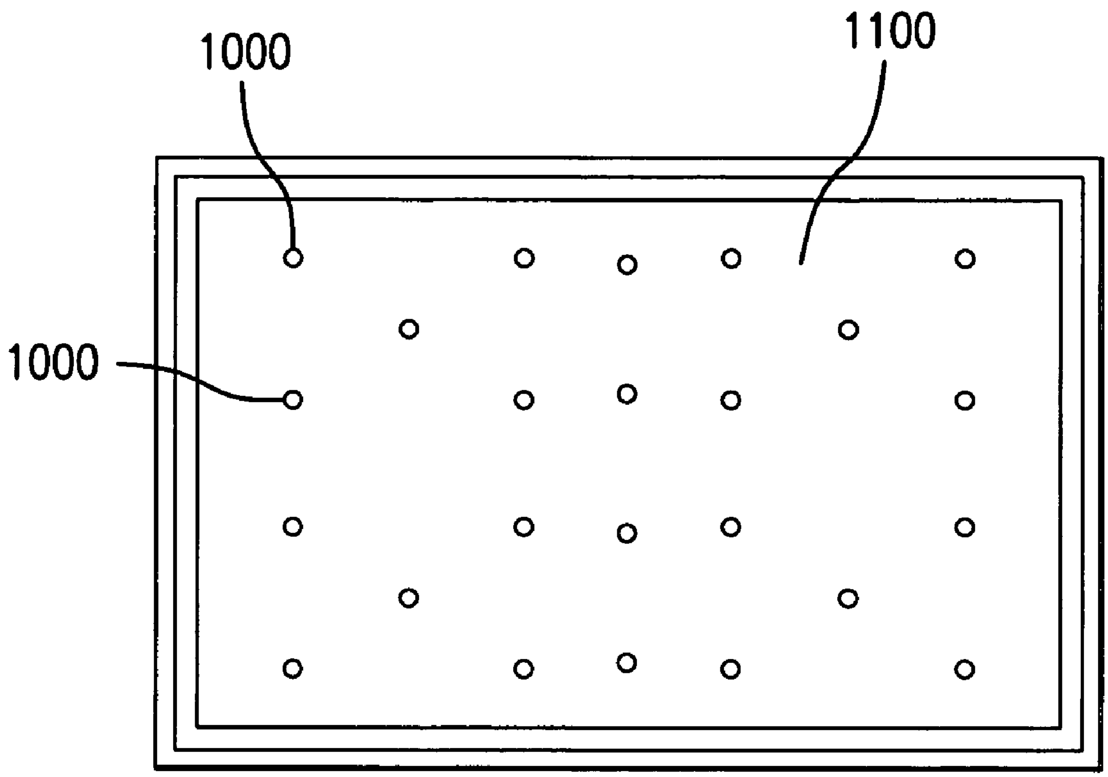

A protective structure utilizing features as illustrated by way of example in FIGS. 11A and 11B may allow for a substantially thin top member or members for a protective enclosure or enclosures of the display assembly 120, since the structure provides for distributed vertical supports for the top member across the assembly as described above. Moreover, such a structure could be used with a single or unitary display device as opposed to modular display devices such as 125, 130, etc. This is shown in FIG. 12, where reference number 1100 indicates a single display device as opposed to an assembly of display modules.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A floor display system, comprising:

a floor covering; and an electronic display assembly associated with the floor covering, the assembly comprising a plurality of distinct display modules configurable to display electronically modifiable arbitrary content and each arranged within a modular protective enclosure comprising one of a common transparent cover or a plurality of separate transparent covers, and one or more vertical supports.

2. The floor display system of claim 1, wherein the modular protective enclosure comprises a top member, a bottom member, and vertical supports.

3. The floor display system of claim 2, where the top member comprises a clear material.

4. The floor display system of claim 3, wherein the clear material comprises at least one of glass and plastic.

5. The floor display system of claim 2, wherein the vertical supports comprise at least one of plastic, metal, glass and wood.

6. The floor display system of claim 2, wherein the vertical supports are horizontal beams.

7. The floor display system of claim 2, wherein the vertical supports are vertical columns.

8. The floor display system of claim 1, wherein each display module is removable from the assembly.

9. The floor display system of claim 1, wherein each modular enclosure is removable from the assembly.

10. The floor display system of claim 1, wherein a thickness of the electronic display assembly is about 1 inch or less.

11. The floor display system of claim 1, wherein a thickness of the electronic display assembly is about ½ inch or less.

12. The floor display system of claim 2, the plurality of display modules capable when aggregated of generating an electronically modifiable arbitrary image larger than an image formed by a single one of said display modules, and wherein said floor display system is connected to a computer.

13. The floor display system of claim 12 wherein said plurality of display modules are located on the floor.

14. The floor display system of claim 12 wherein said floor display system is connected to a network.

15. The floor display system of claim 12 wherein said floor display system is connected to the World Wide Web.

16. A floor display system, comprising an electronic display assembly including a plurality of distinct electronic display modules having a protective cover, the plurality of distinct electronic display modules configurable to display electronically modifiable arbitrary content, the electronically modifiable arbitrary content comprising at least one of:

an independent image formed on a single module, or a composite image, portions of which are respectively formed on each of a plurality of the modules, wherein each of the plurality of the electronic display modules is arranged within a respective modular protective enclosure, wherein vertical supports are formed by sidewalls of the modular protective enclosures.

17. The floor display system of claim 16, wherein a volume of space is provided between a top member of each modular enclosure and a display module received therein.

18. The floor display system of claim 16, wherein the plurality of display modules are configurable to present a coherent display in the aggregate.

19. The floor display system of claim 16, wherein each display module is removable from the assembly, and replaceable by a substitute material of about the same dimensions.

20. The floor display system of claim 16, wherein each modular protective enclosure is removable from the assembly, and replaceable by a substitute material of about the same dimensions.

21. The floor display system of claim 16, wherein the electronic display assembly is associated with a floor covering.

22. The floor display system of claim 16, wherein the electronic display assembly is received within a floor.

23. The floor display system of claim 16, wherein the vertical supports are horizontal beams.

24. The floor display system of claim 16, wherein the vertical supports are vertical columns.

25. The floor display system of claim 16, wherein a thickness of the electronic display assembly is about 1 inch or less.

26. The floor display system of claim 16, wherein a thickness of the electronic display assembly is about ½ inch or less.

27. A floor display system, comprising:

an electronic display device; and a protective structure comprising vertical supports configured to be received by apertures formed in the display device and projecting beyond an upper surface of the display device to support a top member of a protective enclosure of the display device.

28. The floor display system of claim 27, wherein the electronic display device comprises a plurality of display modules.

* * * * *